(12) United States Patent
Schade et al.

(10) Patent No.: US 8,636,262 B2
(45) Date of Patent: Jan. 28, 2014

(54) COUPLING APPARATUS FOR USE WITH ELECTRIC ACTUATORS

(75) Inventors: Ross Arthur Schade, Ames, IA (US); Thomas Pesek, Ankeny, IA (US); Galen Wilke, Ames, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 476 days.

(21) Appl. No.: 12/618,476

(22) Filed: Nov. 13, 2009

(65) Prior Publication Data

US 2011/0114860 A1    May 19, 2011

(51) Int. Cl.
*F16K 31/02* (2006.01)

(52) U.S. Cl.
USPC .............. 251/129.19; 251/83; 251/129.11

(58) Field of Classification Search
USPC .................. 251/83, 129.11, 129.19
See application file for complete search history.

(56) References Cited

U.S. PATENT DOCUMENTS

| | | | | |
|---|---|---|---|---|
| 981,087 | A * | 1/1911 | Hoyt | 137/243.2 |
| 1,641,892 | A * | 9/1927 | Lane | 251/83 |
| 1,679,898 | A * | 8/1928 | Gilbert | 137/243.2 |
| 1,712,298 | A * | 5/1929 | Ford | 137/384 |
| 2,598,062 | A * | 5/1952 | Krecan | 251/129.12 |
| 3,292,895 | A * | 12/1966 | Leger et al. | 251/83 |
| 3,534,770 | A * | 10/1970 | Slawomir | 137/509 |
| 4,151,979 | A * | 5/1979 | Visalli | 251/322 |
| 4,364,541 | A * | 12/1982 | Chabat-Courrede et al. | 251/54 |
| 4,794,309 | A | 12/1988 | Saito et al. | |
| 4,836,497 | A * | 6/1989 | Beeson | 251/80 |
| 5,318,272 | A * | 6/1994 | Smith | 251/129.12 |
| 5,518,462 | A | 5/1996 | Yach | |
| 5,950,668 | A | 9/1999 | Baumann | |
| 6,182,678 | B1 * | 2/2001 | Ma et al. | 137/15.17 |
| 6,371,162 | B1 | 4/2002 | Groeneveld | |
| 6,471,182 | B1 | 10/2002 | McIntosh | |

(Continued)

FOREIGN PATENT DOCUMENTS

| | | |
|---|---|---|
| EP | 1473496 | 11/2004 |
| JP | 04165172 | 6/1992 |
| JP | 2003130235 | 5/2003 |
| WO | 9514186 | 5/1995 |

OTHER PUBLICATIONS

Maxonic Automation Control, "Automation Control," with partial translation, 3 pages.

(Continued)

*Primary Examiner* — John K Fristoe, Jr.
*Assistant Examiner* — Matthew W Jellett
(74) *Attorney, Agent, or Firm* — Hanley, Flight & Zimmerman, LLC.

(57) ABSTRACT

Coupling apparatus for use with electric actuators are described herein. An example coupling apparatus described herein includes a coupling assembly to operatively couple a fluid flow control member of a fluid valve and a drive system of the electric actuator. Rotation of the drive system in a first rotational direction causes the coupling assembly to move in a first rectilinear direction and rotation of the drive system in a second rotational direction causes the coupling assembly to move in a second rectilinear direction opposite the first direction. The coupling assembly includes a biasing element that is to be deflected to provide a seat load to the fluid flow control member when the fluid flow control member is in sealing engagement with a valve seat of the fluid valve and electric power to the electric actuator is removed.

17 Claims, 7 Drawing Sheets

(56) References Cited

U.S. PATENT DOCUMENTS

| | | |
|---|---|---|
| 6,488,260 B1 | 12/2002 | Dietz |
| 6,561,480 B1 | 5/2003 | Komiya et al. |
| 6,769,665 B2 | 8/2004 | Silva et al. |
| 6,997,430 B2 | 2/2006 | Denning et al. |

OTHER PUBLICATIONS

Emerson Process Management, "Baumann Electronic Modulating Actuators," Product Bulletin, May 2009, 8 pages.

Emerson Process Management, "Baumann NV Electric Actuator Instructions," Instruction Manual, May 2009, 12 pages.

Woodward, "GVP-100 Gas Control Valve," 2004, 16 pages.

International Searching Authority, "International Search Report," issued in connection with international application serial No. PCT/US2010/053845, mailed Apr. 5, 2011, 5 pages.

International Searching Authrotiy, "Written Opinion of the International Searching Authority," issued in connection with international application serial No. PCT/US2010/053845, mailed Apr. 5, 2011, 7 pages.

Beck, "Electric Actuators for Industrial Process Control," Feb. 2005, 8 pages.

International Bureau, "International Preliminary Report on Patentability," issued in connection with international application serial No. PCT/US2010/053845, mailed May 24, 2012, 9 pages.

\* cited by examiner

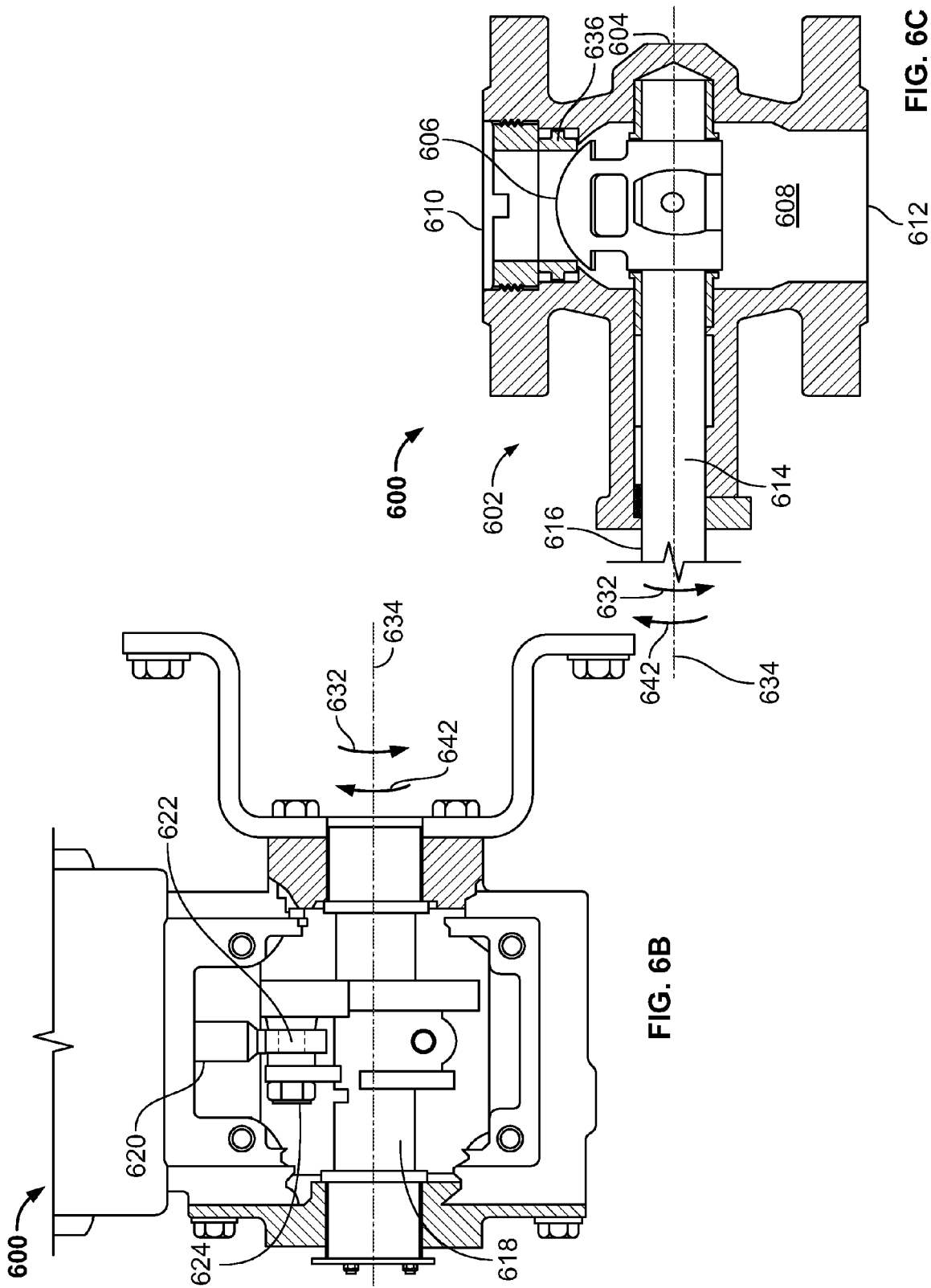

COUPLING APPARATUS FOR USE WITH ELECTRIC ACTUATORS

FIELD OF THE DISCLOSURE

The present disclosure relates generally to electric actuators and, more particularly, to coupling apparatus for use with electric actuators.

BACKGROUND

Control valves (e.g., sliding stem valves) are commonly used in process control systems to control the flow of process fluids. A control valve typically includes an actuator (e.g., an electric actuator, a hydraulic actuator, etc.) that automates operation of the control valve. Sliding stem valves such as gate, globe, diaphragm, pinch, and angle valves typically have a valve stem (e.g., a sliding stem) that drives a fluid flow control member (e.g., a valve plug) between an open position and a closed position.

Electric actuators often employ a motor operatively coupled to a flow control member via a drive system (e.g., one or more gears). During operation, when electric power is supplied to the motor, the electric actuator moves the flow control member between a closed position and an open position to regulate fluid flowing through a valve. When the valve is closed, the flow control member is typically configured to sealingly engage an annular or circumferential seal (e.g., a valve seat) disposed within the flow path to prevent the flow of fluid between an inlet and an outlet of the valve.

When the valve is in the closed position and electric power is provided to the motor, the motor typically provides sufficient seat load to the fluid flow control member to ensure that the fluid flow control member is in sealing engagement with a valve seat of the valve. When electric power is removed from the motor, the drive system (e.g., worm gears) may maintain the position of the fluid flow control member relative to the valve seat and prevent substantial movement of the fluid flow control member in a reverse or opposite direction (e.g., away from the valve seat). However, the drive system may not provide an adequate or sufficient seat load to the fluid flow control member to ensure the fluid flow control member is in sealing engagement with the valve seat. As a result, fluid may leak through the valve between the inlet and the outlet of the valve.

SUMMARY

In one example, a coupling apparatus includes a coupling assembly to operatively couple a fluid flow control member of a fluid valve and a drive system of the electric actuator. Rotation of the drive system in a first rotational direction causes the coupling assembly to move in a first rectilinear direction and rotation of the drive system in a second rotational direction causes the coupling assembly to move in a second rectilinear direction opposite the first direction. The coupling assembly includes a biasing element that is to be deflected to provide a seat load to the fluid flow control member when the fluid flow control member is in sealing engagement with a valve seat of the fluid valve and electric power to the electric actuator is removed.

In another example, a coupling assembly includes a drive member to be operatively coupled to a drive system of the electric actuator. The drive system is to move the drive member between a first position, a second position, and a third position. A housing slidably receives at least a portion of the drive member. A biasing element is disposed between a surface and the drive member such that when the drive member is in the third position, the biasing element deflects to apply a seat load to a fluid flow control member sealingly engaged with a valve seat of a fluid valve when electric power to the electric actuator is removed.

In yet another example, a coupling apparatus includes means for converting rotational motion of a drive system to rectilinear motion of a coupling assembly. The coupling assembly includes means for coupling the means for converting to a valve stem. The means for coupling includes an opening to slidably receive the means for converting via a first end of the means for coupling and to receive the valve stem via a second end of the means for coupling. The coupling assembly also includes means to provide a seat load to a fluid flow control member of a fluid valve coupled to the valve stem when the flow control member is in sealing engagement with a valve seat of the fluid valve, the means to provide a seat load is deflected, and electric power to the electric actuator is removed.

BRIEF DESCRIPTION OF THE DRAWINGS

FIGS. 6A-6C illustrate another example control valve assembly implemented with an example actuator of FIGS. 1-5.

DETAILED DESCRIPTION

In general, the example electric actuators described herein provide a seat load to a fluid valve when electric power to a drive motor of the actuators is removed. The example electric actuators described herein provide a seat load without consuming electric power. More specifically, the example electric actuators may include a biasing element to provide a seat load to a fluid flow control member of a valve when the fluid flow control member is in sealing engagement with a valve seat and the electric actuator (e.g., an electric motor) is not receiving electric power. For example, the biasing element may be implemented as one or more springs that exert a force to provide a seat load to a fluid flow control member (e.g., a valve plug) operatively coupled to the electric actuator when the fluid flow control member is sealingly engaged with the valve seat (e.g., a closed position) and a power supply source fails to provide power to a motor of the electric actuator.

In contrast, some known electric actuators use a complex combination of biasing elements, clutches and brake systems that provide a sufficient seat load when the electric actuator is in a fail-safe condition. In other words, known electric actuators may include a biasing element to move a flow control member of a valve to a closed position during, for example, a power failure. Thus, if the fluid valve is in the open position when a power failure occurs, the biasing element moves the fluid flow control member to the closed position. However, these known actuators often include complex assemblies. Additionally, some of these known actuation systems having fail-safe apparatus typically include a declutchable gear box to enable operation of the fail-safe apparatus. In other words, a drive assembly must typically be operatively decoupled from, for example, a gear transmission to enable operation of the fail-safe apparatus. However, declutchable gearboxes are relatively expensive, difficult to operate, enlarge the dimensional envelope of a valve and actuator assembly, and involve complex assemblies with the actuator. Additionally, such fail-safe apparatus may not be required and/or desired for some applications, thereby unnecessarily increasing the costs of a control valve assembly.

Figure 1:
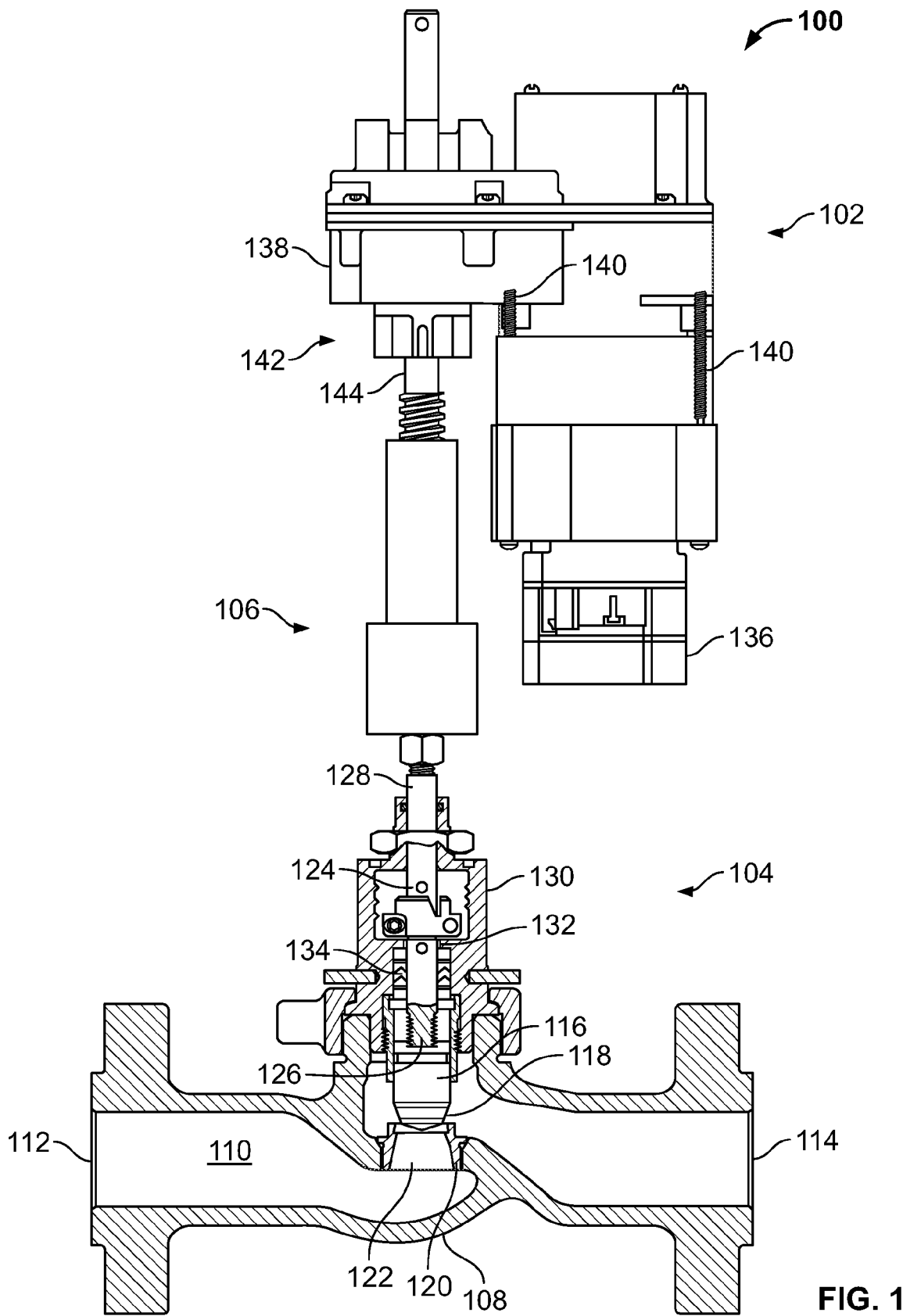
FIG. 1 illustrates an example control valve assembly described herein.

FIG. 1 illustrates an example control valve assembly 100 described herein. The control valve assembly 100 includes an electric actuator 102 operatively coupled to a fluid valve 104 via a coupling assembly 106. The fluid valve 104 includes a valve body 108 that defines a fluid flow passageway 110 between an inlet 112 and an outlet 114. A fluid flow control member 116 (e.g., a valve plug) is disposed within the fluid flow passageway 110 and includes a seating surface 118 that sealingly engages with a valve seat 120 to control fluid flow through a port area or orifice 122 between the inlet 112 and the outlet 114. A valve stem 124 is coupled (e.g., threadably coupled) to the fluid flow control member 116 at a first end 126 and is operatively coupled to the electric actuator 102 at a second end 128 via the coupling assembly 106. A bonnet 130 is coupled to the valve body 108 and includes a bore 132 to slidably receive the valve stem 124. The bonnet 130 houses a valve packing assembly 134 that provides a seal to oppose the pressure of the process fluid flowing through the fluid valve 104 to prevent leakage of process fluid past the valve stem 124 and/or protect the environment against the emission of hazardous or polluting fluids.

In this example, the electric actuator 102 includes a motor 136 coupled to a housing 138 of the electric actuator 102 via, for example, fasteners 140 and/or any other suitable fastening mechanism(s). The motor 136 may be any motor such as, for example, an alternating current (AC) motor, a direct current (DC) motor, a variable frequency motor, a stepper motor, a servo motor, or any other suitable motor or drive member.

The motor 136 is operatively coupled to a drive system 142. The drive system 142 includes a drive member or output shaft 144 operatively coupled to the motor 136 via a transmission (not shown) (e.g., a gear transmission) disposed within the housing 138 of the electric actuator 102. As shown, the output shaft 144 is a screw. However, in other examples, the output shaft 144 may be a gear system, a ball screw system, a lead-screw system, and/or any other suitable transmission system to convert rotational motion of the motor 136 to rectilinear motion of the valve stem 124.

Although not shown, the transmission may be a gear transmission or gearbox having a spur gear, a planetary gear, or any other suitable transmission. The transmission may be configured to amplify the torque generated by the motor 136 and transmit the amplified torque to the output shaft 144. The amplified torque transmitted to the output shaft 144 enables the flow control member 116 to engage the valve seat 120 with a greater force and, thus, provide a tighter sealing engagement with the valve seat 120 to prevent the flow of fluid through the valve body 108 when the flow control member 116 is sealingly engaged with the valve seat 120 and electric power is provided to the motor 136. Also, a relatively smaller sized motor 136 may be used to drive the flow control member 116 with a transmission configured to amplify the torque generated by the motor 136. For example, the amount of torque amplification provided by the transmission can vary based on the size (e.g., the diameter, number of gear teeth, etc.) of a gear. In yet other examples, the motor 136 may be directly coupled to the output shaft 144 or the second end 128 of the valve stem 124. In such a direct-drive configuration, the motor 136 directly drives the output shaft 144 or the valve stem 124 without any other interposing mechanism or device such as a transmission or the like.

Figure 2:
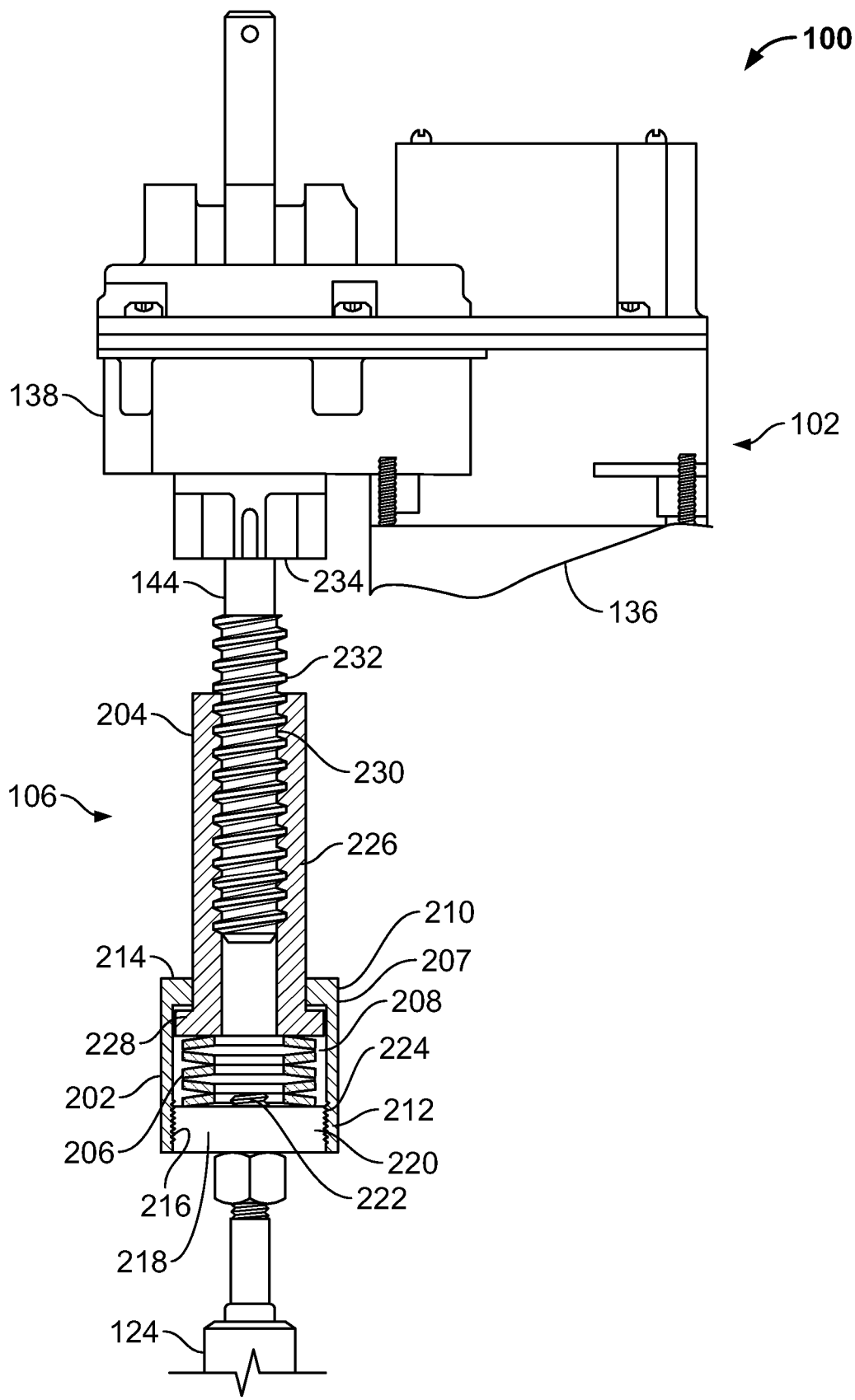
FIG. 2 illustrates an example coupling assembly described herein used to implement the example control valve assembly of FIG. 1.

As shown in FIG. 2, the coupling assembly 106 includes a housing 202, a drive coupler or drive member 204 slidably coupled to the housing 202, and a biasing element 206. The housing 202 includes a body 207 (e.g., a cylindrically-shaped body, a rectangular-shaped body, etc.) having an aperture or opening 208 therethrough between a first end 210 of the housing 202 and a second end 212 of the housing 202 opposite the first end 210. As shown, the opening 208 adjacent the first end 210 has a diameter that is smaller than the diameter of the opening 208 adjacent the second end 212 to provide a stepped surface or shoulder 214 (e.g., integrally formed with the housing 202). In other examples, a flange (not shown) may be coupled to the housing 202 to provide the stepped surface or shoulder 214. Also, as shown, the opening 208 adjacent the second end 212 includes a threaded portion 216 to threadably receive an insert 218 (e.g., a fastener, a nut, etc.). The insert 218 includes a body portion 220 having an internally threaded aperture to receive a threaded portion 222 of the valve stem 124 and an externally threaded outer portion 224. The externally threaded outer portion 224 threadably couples the insert 218 to the housing 202 via the threaded portion 216 of the opening 208, thereby coupling the valve stem 124 to the housing 202.

However, in other examples, the housing 202 may be configured to receive the threaded portion 222 of the valve stem 124. In yet other examples, the insert member 218 may be fastened to the housing 202 (e.g., to the second end 212 of the housing 202) via a fastener (e.g., a bolt, a rivet, a pin, etc.), interference fit, press fit, and/or any other suitable fastening mechanism(s).

The drive member 204 includes a body portion 226 (e.g., a cylindrically-shaped body portion) and a flanged portion 228. The body portion 226 includes a threaded bore 230 to threadably receive a threaded portion 232 of the output shaft 144. The flanged portion 228 is disposed or captured within the opening 208 of the housing 202 between the biasing element 206 and the shoulder 214 of the housing 202. The flange portion 228 retains the drive member 204 to operatively couple the drive member 204 to the housing 202.

The biasing element 206 is disposed within the housing 202 between the insert member 218 (or the valve stem) and the flange portion 228 of the drive member 204. In this example, the biasing element 206 includes a stack of Belleville springs. In general, a Belleville spring provides a relatively high loading relative to the travel or deflection imparted on the Belleville spring. Thus, as a result, the example coupling assembly 106 may be configured to have a relatively small footprint, thereby reducing the overall envelope or footprint of the control valve assembly 100. In other examples, the biasing element 206 may be a coil spring, spring washers and/or any other suitable biasing element(s).

In other examples, the biasing element 206 may be disposed within the housing 202 between the flange 228 and the shoulder 214. In yet another example, a biasing element (e.g., a spring) may be disposed between an end 234 of the housing 138 and the drive member 204. In yet other examples, the coupling assembly 106 and/or the biasing element 206 may be configured to provide a seat load in a direction opposite to the direction of the seat load provided in the example coupling assembly 106 shown in FIG. 2. Such a configuration enables the coupling assembly 106 to be used with a fluid valve having a fluid control member and a valve seat in a configuration opposite that shown in FIG. 1 (e.g., a push-to-open fluid valve).

Figure 3:
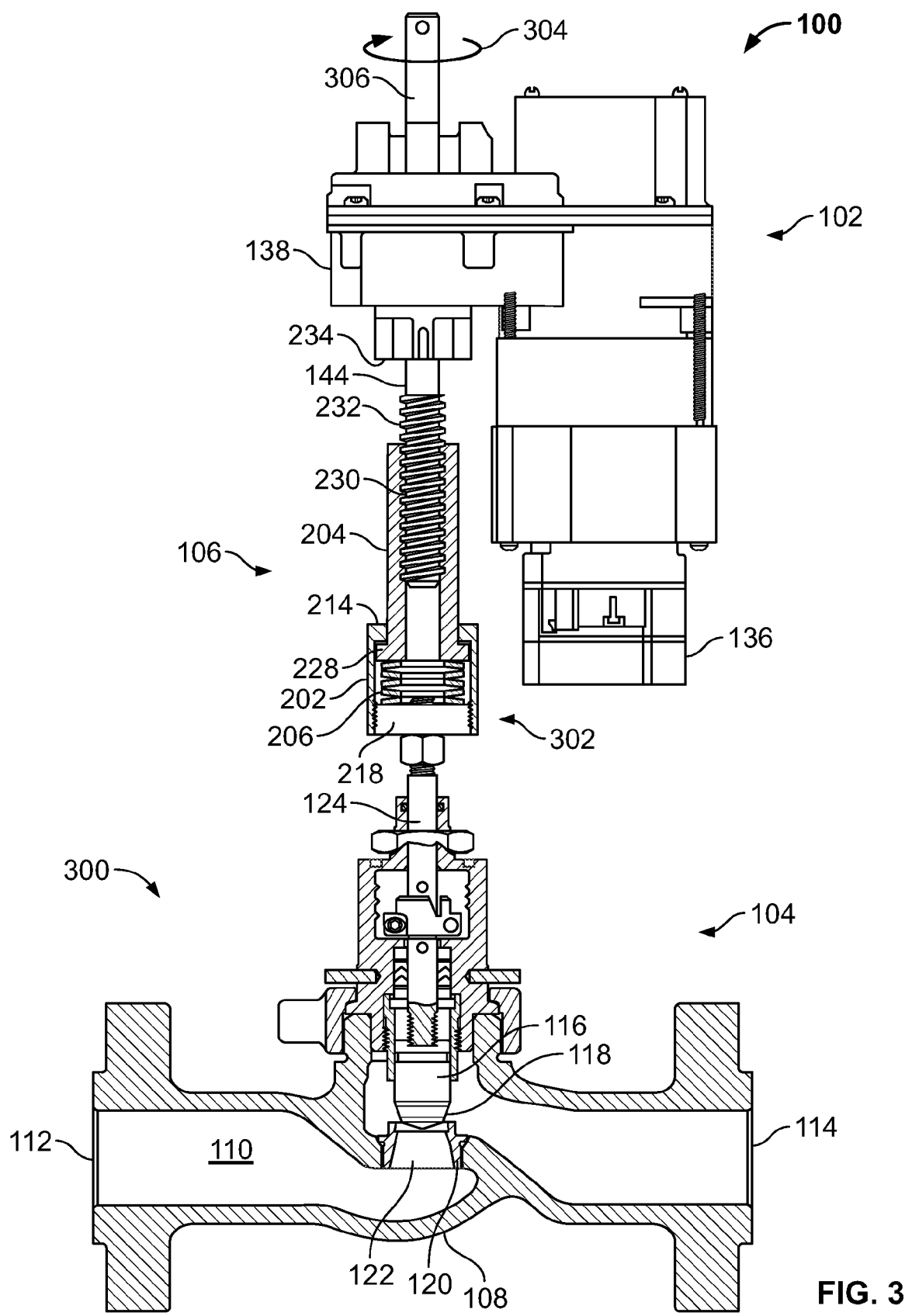
FIG. 3 illustrates the example control valve assembly of FIG. 1 shown in an open position.
Figure 4:
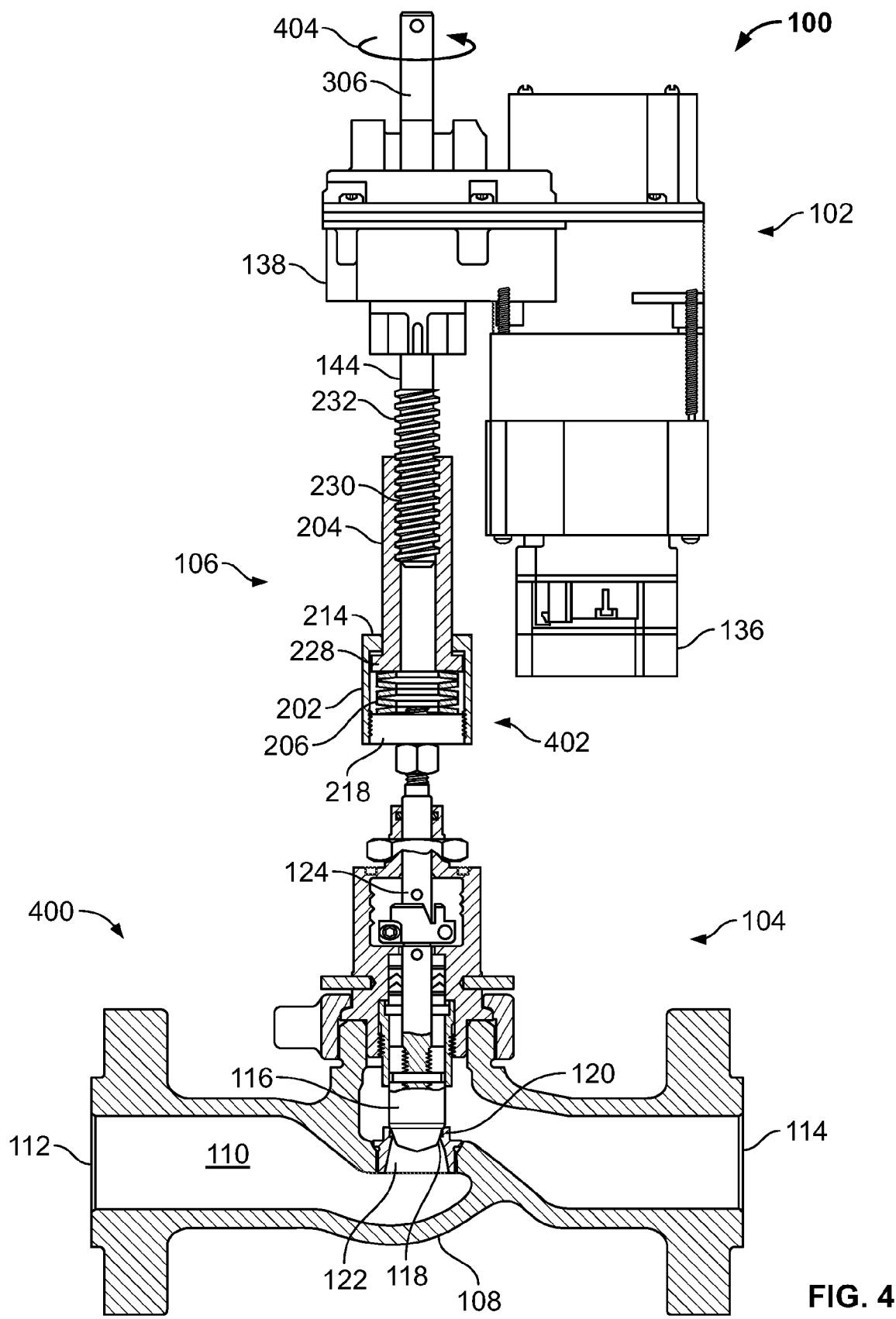
FIG. 4 illustrates the example control valve assembly of FIG. 1 shown in an intermediate position.
Figure 5:
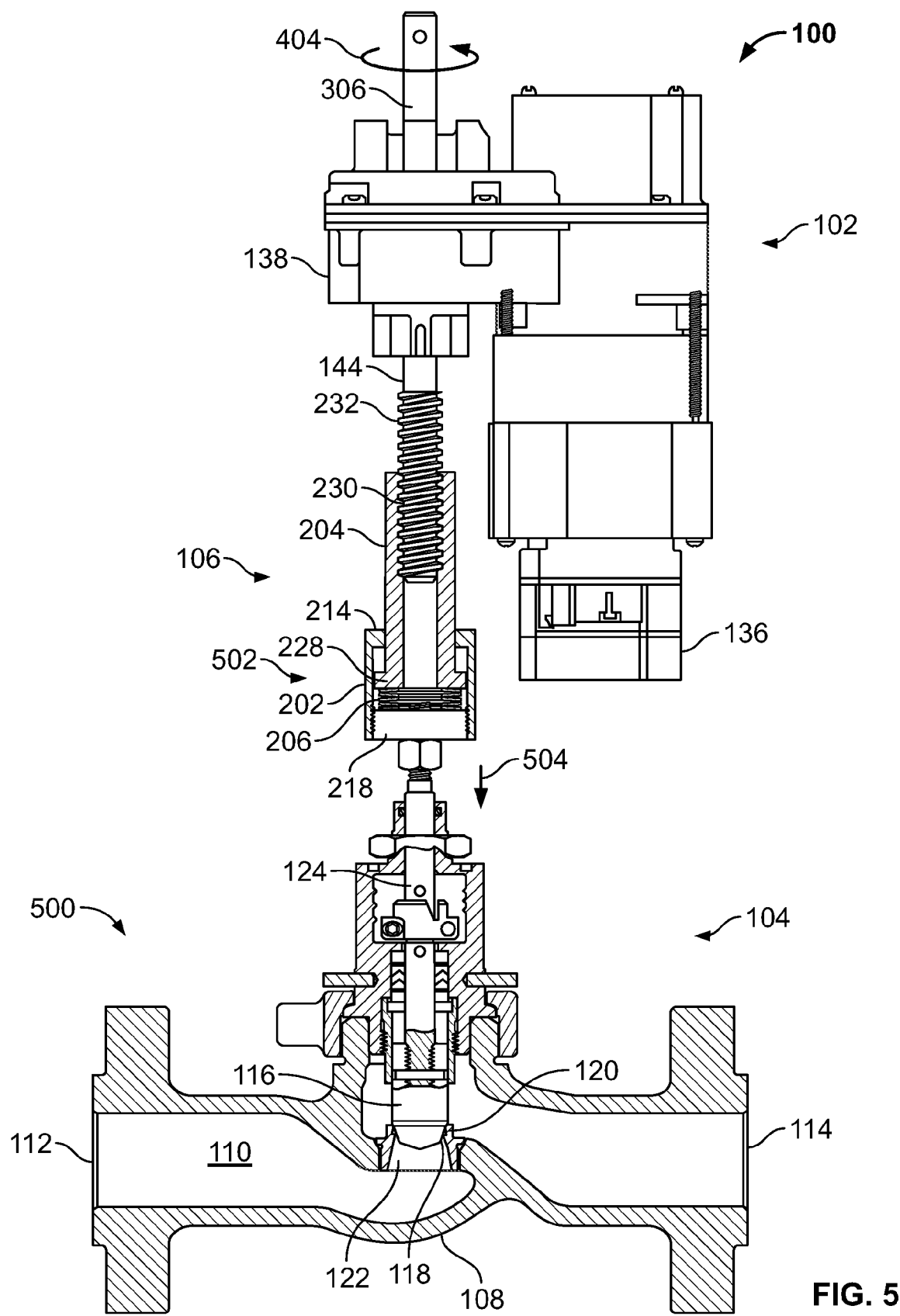
FIG. 5 illustrates the example control valve assembly of FIG. 1 shown in a closed position.

Referring to FIG. 3, the fluid valve 104 is depicted in an open position 300 and the biasing element 206 of the coupling assembly 106 is in a first or a substantially non-deflected condition 302. FIG. 4 illustrates the fluid valve in a closed position 400, but showing the biasing element 206 of the coupling assembly 106 in a substantially non-deflected condition 402. FIG. 5 illustrates the fluid valve in a closed position 500 and shows the biasing element 206 in a substantially deflected condition 502 to provide a seat load 504 to the flow control member 116.

Referring to FIGS. 3-5, in operation, the motor 136 drives or rotates the output shaft 144 in a first direction 304 (e.g., a clockwise direction) about an axis 306 to move the fluid valve 104 toward the open position 300 as shown in FIG. 3 and a second direction 404 (e.g., a counterclockwise direction) opposite the first direction 304 about the axis 306 to move the fluid valve 104 toward the closed positions 400 and 500 as shown in FIGS. 4 and 5.

To move the fluid valve 104 toward the open position 300, electric power is provided to the motor 136. The transmission (not shown) causes the output shaft 144 to rotate in the first direction 304 (e.g., a clockwise direction) about the axis 306. Rotation of the output shaft 144 in the first direction 304 causes the coupling assembly 106 to move in a rectilinear motion along the axis 306 in a direction away from the fluid valve 104. More specifically, as the output shaft 144 rotates in the first direction 304, the threaded portion 232 of the output shaft 144 rotates within the threaded bore 230 of the drive member 204 to cause the drive member 204 to move rectilinearly in a direction along the axis 306 such that the flange portion 228 engages the shoulder 214 of the housing 202. The flange portion 228 of the drive member 204 engages the shoulder 214 of the housing 202 to cause the housing 202 to move in a rectilinear direction away from the fluid valve 104. In turn, the housing 202 causes the flow control member 116 to move away from the valve seat 120 to allow or increase fluid flow through the fluid flow pathway 110 between the inlet 112 and the outlet 114.

To move the fluid valve 104 toward the closed position 400 as shown in FIG. 4, electrical power is provided to the motor 136 to cause the output shaft 114 to rotate in the second direction 404 (e.g., a counterclockwise direction) via the transmission. Rotation of the output shaft 144 in the second direction 404 causes the coupling assembly 106 to move rectilinearly along the axis 306 in a direction toward the valve body 108. More specifically, the threaded portion 232 of the output shaft 144 rotates within the threaded bore 230 of the drive member 204 to cause the drive member 204 to move rectilinearly in a direction along the axis 306. In turn, the coupling assembly 106 causes the flow control member 116 to move toward the valve seat 120 to restrict or prevent fluid flow between the inlet 112 and the outlet 114.

The biasing element 206 provides a biasing force and is in the substantially non-deflected condition 402 as the drive member 204 moves toward the fluid valve 104. The biasing force provided by the biasing element 206 enables drive member 204 to move the housing 202 in linear direction toward the fluid valve 104. Additionally, the biasing force provided by the biasing element 206 substantially reduces or eliminates lost motion that may otherwise occur between the drive member 204, the housing 202, the valve stem 124, etc. In other words, the biasing force provided by the biasing element 206 enables the coupling assembly 106 to move as a substantially unitary structure when the coupling assembly 106 moves between the position shown in FIG. 3 and the position shown in FIG. 4. Of course, in other examples, the biasing element 206 may be configured to deflect prior to the drive member 204 moving the housing 202 toward the valve body 108, which will also substantially reduce or prevent lost motion between the housing 202, the drive member 204, the valve stem 124 or any other component of the control valve assembly 100.

When the valve 102 is in the closed position 400, the seating surface 118 of the fluid flow control member 116 sealingly engages the valve seat 120 to prevent fluid flow through the valve 102. At this position, the housing 202 no longer move further toward the valve seat 120 because the valve stem 124 is rigidly coupled to the housing 202 via the insert member 218 and the fluid flow control member 116 is in engagement with the valve seat 120 (e.g., an end of travel or stroke position). However, the motor 136 continues to drive the drive member 204 in a rectilinear direction toward the valve seat 120 to cause the biasing element 206 to deflect or compress as shown in FIG. 5 because the drive member 204 is slidably coupled to the housing 202. In other words, the housing 202 remains in the position as shown in FIG. 4 and the flange portion 228 of the drive member 204 moves in a rectilinear direction away from the shoulder 214 of the housing 202 to deflect or compress the biasing element 206 as shown in FIG. 5.

When in the closed position 500 as shown in FIG. 5, the motor 136 provides a seat load to the fluid flow control member 116 when electric power is provided to the motor 136. However, when electric power is removed from the motor 136, the flow control member 116 may lack adequate or sufficient seat load to sealingly engage the valve seat 120. Although a backdrive resistance of the motor 136 and/or the transmission maintains the position or prevents rectilinear motion of the drive member 204, the backdrive resistance of the motor 136 and/or the transmission may not be adequate to maintain or provide a seat load to the flow control member 116 when electric power is removed from the motor 136. An adequate or sufficient seat load prevents fluid leakage through the orifice 122 when the flow control member 116 is sealingly engaged with the valve seat 120. In other words, an adequate or sufficient seat load maintains the fluid flow control member 116 in sealing engagement the valve seat 120 to substantially prevent fluid flow through the passageway 210 of the fluid valve 104. Absent such a seat load, fluid may leak past the orifice 122 even when the sealing surface 118 of the fluid flow control member 116 engages the valve seat 120.

The coupling assembly 106 provides the mechanical seat load 504 to maintain or keep the fluid flow control member 116 in sealing engagement with the valve seat 120 if electric power is removed from the motor 136 while the flow control member 116 is sealingly engaged with the valve seat 120. For example, it may be necessary to keep or retain the fluid valve 104 in the closed position 400 to prevent a spill (e.g., a chemical spill) during emergency situations, power failures, or if the electric power supply to the electric actuator 102 (e.g., the motor 136) is removed or shut down. Otherwise, failing to provide an adequate or sufficient seat load to the fluid flow control member 116 during, for example, a power outage may cause fluid flow to pass through the orifice 122 of the valve 104 between the inlet 112 and the outlet 114. For example, the pressure of the pressurized fluid at the inlet 112 may provide a force against the fluid flow control member 116 (e.g., in a direction toward the bonnet 130 in the orientation of FIG. 5) to cause the sealing surface 118 of the fluid flow control member 116 to move away from the valve seat 120 and allow fluid to flow or leak toward the outlet 114.

Thus, the example coupling assembly 106 provides the seat load 504 to the fluid flow control member 116 to prevent fluid flow through the fluid flow pathway 110 when the fluid valve 104 is in the closed position 500 and electric power is removed from the electric actuator 102. In particular, the coupling assembly 106 provides a seat load for an indefinite period of time. Additionally or alternatively, the coupling assembly 106 provides a seat load (e.g., the seat load 504) without consumption of electric power (i.e., with substantially zero electric power consumption). Thus, in some examples, when the valve 104 is in the closed position 500, electric power to the motor 136 may be removed to conserve energy, thereby improving the performance and/or the efficiency of the electric actuator 102.

Additionally, the example electric actuator 102 reduces manufacturing costs and simplifies maintenance of the control valve assembly 100 because the coupling assembly 106 does not require a clutching mechanism, a complex combination of biasing elements and/or brake systems to provide a seat load when the electric power to the electric actuator 102 is removed.

Although not shown, the example coupling assembly 106 may be implemented with control valve assemblies having a fail-safe mechanism. For example, the example control valve assembly 100 may be implemented with a biasing element or system that causes the flow control member 116 to move to the closed position 400 of FIG. 4 during, for example, a power failure or when power is not provided to the motor 136. Such fail-safe mechanism may be implemented via, for example, a clutch mechanism.

Figure 6A:
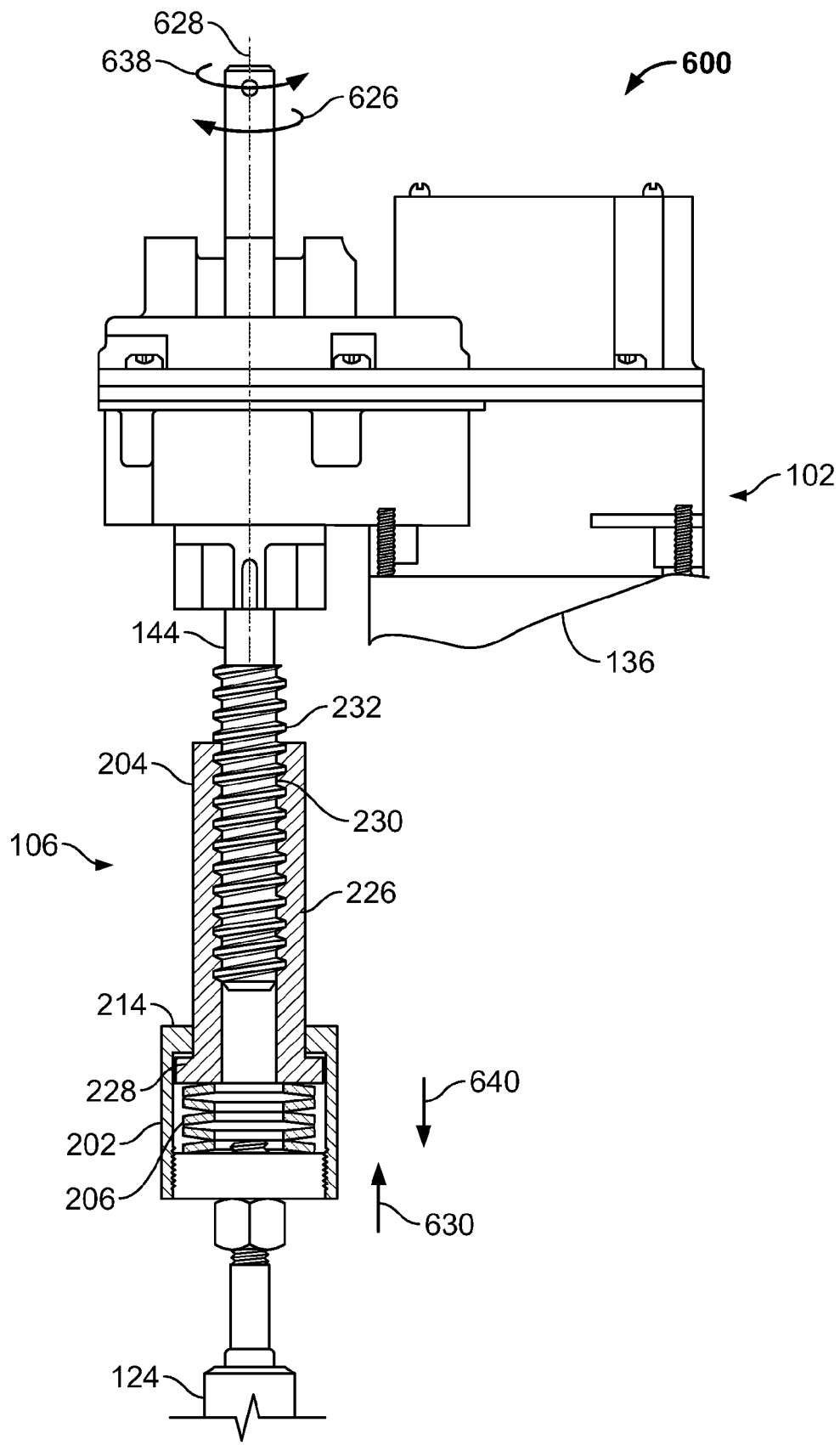

The example electric actuator 102 may be used to implement other types of valves or control devices. For example, FIGS. 6A-6C illustrate an example control valve assembly 600 having the example electric actuator 102 of FIGS. 1-5 coupled to a rotary valve 602. The rotary valve 602 includes a valve body 604 having a disk or flow control member 606 interposed in a fluid flow path 608 between an inlet 610 and an outlet 612. The flow control member 606 is rotatably coupled relative to the valve body 604 via a valve shaft 614. A portion 616 (e.g., a splined end) of the valve shaft 614 extends from the rotary valve 602 and is received by a lever 618. In turn, the lever 618 operatively couples the drive member 204 of the electric actuator 102 and the flow control member 606. A rod end bearing 620 is coupled (e.g., threadably coupled) to the first end 126 (FIG. 1A) of the valve stem 124 and couples to a lever arm 622 of the lever 618 via a fastener 624 to operatively couple the lever 618 and the drive member 204. The lever 618 converts a rectilinear displacement of the drive member 204 into a rotational displacement of the valve shaft 614.

In operation, the motor 136 rotates the output shaft 144 in a first direction 626 (e.g., a clockwise direction) about an axis 628. Rotation of the output shaft 144 in the first direction 626 causes the coupling assembly 106 to move in a rectilinear motion 630 along the axis 628. More specifically, as the output shaft 144 rotates in the first direction 626, the threaded portion 232 of the output shaft 144 rotates within the threaded bore 230 of the drive member 204 to cause the drive member 204 to move rectilinearly in the first direction 630 along the axis 628 such that the flange portion 228 engages the shoulder 214 of the housing 202. The flange portion 228 of the drive member 204 engages the shoulder 214 of the housing 202 to cause the housing 202 to move in the first rectilinear direction 630. In turn, the drive member 204 causes the lever 618 to rotate in a first direction 632 about an axis 634. Rotation of the valve shaft 614 in the first direction 632 about the axis 634 causes the flow control member 606 to rotate away from a sealing surface 636 (e.g., an open position) to allow fluid flow through the valve body 604 between the inlet 610 and the outlet 612.

When the motor 136 rotates the output shaft 144 in a second direction 638 (e.g., a counterclockwise direction) about the axis 628, the threaded portion 232 of the output shaft 144 rotates within the threaded bore 230 of the drive member 204 to cause the drive member 204 to move in a second rectilinear direction 640. When the drive member 204 moves in the second rectilinear direction 640, the coupling assembly 106 causes the lever 614 to rotate in a second direction 642 about the axis 634. Rotation of the valve shaft 614 in the second direction 642 about the axis 634 causes the flow control member 606 to rotate toward the sealing surface 636 (e.g., a closed position) to prevent or restrict fluid flow through the valve body 604 between the inlet 610 and the outlet 612. When in the closed position, the motor 136 continues to rotate the output shaft 144 in the second direction 638. However, the housing 202 cannot move further in the second rectilinear direction 640 (i.e., the housing reached an end of stroke position) when the flow control member 606 sealingly engages the sealing surface 636. As a result, the motor 136 continues to rotate the output shaft 144 in the second direction 638 relative to the drive member 204 and causes the drive member 204 to move in the second rectilinear direction 640 along the axis 628 toward the biasing element 206 to compress or deflect the biasing element 206 of the coupling assembly 106. In other words, in this example, the shoulder 228 of the drive member 204 moves away from the shoulder 214 of the housing 202 to compress the biasing element 206 and provide a seat load to the flow control member 606 when the flow control member 606 is in sealing engagement with the sealing surface 636 and the motor 136 continues to drive the drive member 204 in the second rectilinear direction 640.

Although the backdrive resistance of the transmission and/or the motor 136 prevents the lever 618 from rotating in the first direction 632 about the axis 634 when electric power to the motor 136 is removed, the backdrive resistance of the transmission and/or motor 136 may not provide an adequate or sufficient seat load to prevent leakage of fluid through the pathway 608 when the rotary valve 602 is in the closed position. For example, the pressure of the fluid at the inlet 610 may cause fluid leakage between the flow control member 606 and the sealing surface 636 if an insufficient seat load is provided to the flow control member 606. However, when the biasing element 206 is in the deflected or compressed condition, the biasing element 206 exerts a force to provide an adequate or sufficient mechanical seat load to maintain or keep the fluid flow control member 606 in sealing engagement with the sealing surface 636 when electric power is removed from the motor 136 and the flow control member 606 is sealingly engaged with the sealing surface 636. In other words, for example, the biasing element 206, when deflected or compressed, provides a force that substantially restricts or prevents a relatively high pressure fluid at the inlet 610 from leaking between the flow control member 606 and the sealing surface 636 and through the pathway 608 when the fluid flow control member 606 sealingly engages the sealing surface 636 and electric power to the motor 136 is removed.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A coupling apparatus for use with an electric actuator, comprising:
   a coupling assembly to operatively couple a fluid flow control member of a fluid valve and a drive system of the electric actuator, wherein the coupling assembly comprises:
   a drive member to be threadably coupled to a threaded output shaft of the drive system of the electric actuator to convert rotational motion of the output shaft into rectilinear motion of the coupling assembly, the drive member having a flange adjacent a first end of the drive member
   a housing having an opening to slidably receive the drive member, the housing includes a stepped surface adjacent a first end of the housing and the flange of the drive member;
   a biasing element positioned in the opening of the housing, the biasing element to be deflected to provide a seat load to the fluid flow control member to prevent fluid leakage through the fluid valve when the fluid flow control member is in sealing engagement with a valve seat of the fluid valve and electric power to the electric actuator is removed, the biasing element being deflected when the flow control member is in sealing engagement with the valve seat and the flange of the drive member moves away from the stepped surface of the housing.

2. A coupling apparatus as defined in claim 1, wherein the housing further comprises a threaded portion adjacent a second end of the housing to threadably receive a valve stem coupled to the fluid flow control member.

3. A coupling apparatus as defined in claim 2, wherein the drive member further comprises an internally threaded bore to threadably receive the output shaft of the drive system, the flange to engage the stepped surface of the housing to operatively couple the drive member and the housing.

4. A coupling apparatus as defined in claim 3, further comprising an insert member to be received by the threaded portion of the housing to couple the valve stem to the housing.

5. A coupling apparatus as defined in claim 4, wherein the biasing element is disposed within the opening of the housing between the flange of the drive member and the insert member.

6. A coupling apparatus as defined in claim 1, wherein the biasing element comprises a Belleville spring.

7. A coupling apparatus for use with an electric actuator comprising:
   a drive member to be operatively coupled to a drive system of the electric actuator, the drive member to be moved by the drive system between a first position, a second position, and a third position;
   a housing to slidably receive at least a portion of the drive member, the housing having a body that includes an opening therethrough, a stepped surface adjacent a first end and a threaded portion adjacent a second end that is to threadably receive a valve stem, the drive member having a body that includes a threaded bore to receive a threaded output shaft of the drive system at a first end and a flanged portion adjacent a second end of the body, the drive member to be slidably coupled to the housing at the second end; and
   a biasing element disposed between a surface of the housing and the drive member such that the drive member is to deflect the biasing element when the flanged portion of the drive member moves away from the stepped surface of the housing when the drive member is in the third position, the biasing element deflects to apply a seat load to a fluid flow control member sealingly engaged with a valve seat of a fluid valve to prevent fluid leakage through a passageway of a fluid valve body when electric power to the electric actuator is removed.

8. A coupling apparatus of claim 7, wherein the flanged portion of the drive member is disposed within the opening of the housing and is to engage the stepped portion of the housing when the drive member moves the housing between the first position and the second position.

9. A coupling apparatus of claim 7, further comprising an insert to couple the valve stem to the threaded portion of the housing, wherein the insert includes an externally-threaded body and an internally threaded bore to threadably receive the valve stem.

10. A coupling apparatus of claim 9, wherein the biasing element comprises a Belleville spring disposed within the opening of the housing between the insert and the flanged portion of the drive member.

11. A coupling apparatus for use with an electric actuator, comprising;
   means for converting rotational motion of the electric actuator to rectilinear motion of the coupling apparatus, the means for converting having a flanged end;
   means for coupling the means for converting to a valve stem of a fluid valve, the means for coupling having an opening to slidably receive the means for converting via a first end of the means for coupling and to receive the valve stem via a second end of the means for coupling, the means for coupling having a stepped surface adjacent a first end of the opening to engage the flanged end of the means for converting; and
   means for providing a seat load to a fluid flow control member of the fluid valve coupled to the valve stem to prevent fluid leakage through the fluid valve when the flow control member is in sealing engagement with a valve seat of the fluid valve, the means to provide a seat load is deflected when the flanged end of the means for converting moves away from the stepped surface of the means for coupling and electric power to the electric actuator is removed.

12. A coupling apparatus as defined in claim 11, wherein the means for coupling comprises a housing.

13. A coupling apparatus as defined in claim 11, wherein the means for coupling includes means for attaching the valve stem to the means for coupling.

14. A coupling apparatus as defined in claim 11, wherein means for converting comprises means to receive an output shaft of a drive system of the electric actuator, wherein rotation of the drive system in a first rotational direction causes the means for converting to move in a first rectilinear direction and rotation of the drive system in a second direction causes the means for converting to move in a second rectilinear direction opposite the first direction.

15. A coupling apparatus as defined in claim 11, wherein the means to provide a seat load comprises means for biasing disposed between a surface of the means for coupling and a surface of the means for converting.

16. A coupling apparatus as defined in claim 1, wherein rotation of the drive system in a first rotational direction causes the coupling assembly to move in a first rectilinear direction and rotation of the drive system in a second rotational direction causes the coupling assembly to move in a second rectilinear direction opposite the first direction.

17. A coupling apparatus as defined in claim 1, wherein the coupling assembly is to be positioned completely externally relative to a dimensional envelope of the fluid valve.

* * * * *